(12) United States Patent
Yu et al.

(10) Patent No.: US 7,367,585 B2
(45) Date of Patent: May 6, 2008

(54) INFLATING DEVICE FOR AN AIR BAG OF A VEHICLE

(75) Inventors: Ming-Chang Yu, Changhua Hsien (TW); Shih-Ju Kuo, Changhua Hsien (TW); Chien-Liang Hsieh, Changhua (TW)

(73) Assignee: GSK Intex Co., Ltd., Chang-Hua (TW)

( * ) Notice: Subject to any disclaimer, the term of this patent is extended or adjusted under 35 U.S.C. 154(b) by 402 days.

(21) Appl. No.: 11/230,607

(22) Filed: Sep. 21, 2005

(65) Prior Publication Data
US 2007/0063496 A1  Mar. 22, 2007

(51) Int. Cl.
*B60R 21/30* (2006.01)

(52) U.S. Cl. .................................... 280/738; 280/741

(58) Field of Classification Search ............... 280/736, 280/742, 740, 728.2, 741, 738, 732
See application file for complete search history.

(56) References Cited

U.S. PATENT DOCUMENTS

| | | | | |
|---|---|---|---|---|
| 4,698,107 A | * | 10/1987 | Goetz et al. ................... 149/7 |
| 4,878,690 A | * | 11/1989 | Cunningham ................ 280/741 |
| 5,100,171 A | * | 3/1992 | Faigle et al. ................. 280/736 |
| 5,217,249 A | * | 6/1993 | Kokeguchi ................ 280/728.1 |
| 5,226,670 A | * | 7/1993 | Wright et al. ................ 280/738 |
| 5,513,876 A | * | 5/1996 | Matsumoto ............... 280/728.1 |
| 5,609,354 A | * | 3/1997 | Lauritzen et al. ......... 280/728.2 |
| 5,718,447 A | * | 2/1998 | Rose et al. ............... 280/728.2 |
| 5,967,551 A | * | 10/1999 | Newkirk et al. ............. 280/740 |

* cited by examiner

*Primary Examiner*—Joe H. Cheng
*Assistant Examiner*—Nicole Verley
(74) *Attorney, Agent, or Firm*—Troxell Law Office, PLLC

(57) ABSTRACT

An inflating device has a casing, an air bag tray, an gas generating device and a check valve. The gas generating device is mounted on the casing and has a tube, an gas generator and a guiding plate. The tube extends into the casing and has an air channel and vents. The gas generator is attached to one end of the tube and has a housing, a chemical holder and an igniting device. The chemical holder is mounted inside the housing to contain chemicals. The igniting device is attached to housing and extends into the chemical holder to ignite the chemicals. The guide plate is mounted inside the casing and corresponds to the vents. The check valve is mounted in the casing and corresponds with and closes an inlet of the casing.

18 Claims, 4 Drawing Sheets

US 7,367,585 B2

INFLATING DEVICE FOR AN AIR BAG OF A VEHICLE

BACKGROUND OF THE INVENTION

1. Field of the Invention

The present invention relates to an inflating device, and more particularly to an inflating device for an air bag of a vehicle and one that can reduce the amount of chemicals used in such air bags.

2. Description of Related Art

In moving vehicles such as cars and trucks, serious injury often occurs in sudden braking as the vehicle occupants are violently thrown around. Although seat belts are fitted to cars, many people refuse to wear them and so non-choice methods, such as air bags were devised. That is, the air bag will automatically inflate in certain circumstances and this actuation needs no input from occupants. Furthermore, the airbag does not restrict the occupants in any way during normal driving conditions. To inflate an air bag, specific chemicals are contained in the air bag and an igniting device is mounted in the vehicle beneath the air bag. When the vehicle experiences impact such as in collision with another, the igniting device will be actuated to ignite the chemicals so as to make the chemicals to release nitrogen. Consequently, the air bag can be inflated in 20 to 30 ms (millisecond) to keep the occupants from being injured.

To provide a sufficient damping effect to the driver or passenger in time, the air bag must be entirely inflated as rapidly as possible. However, the bag must be of quite a large size to prevent the vehicle occupant from being thrown around, yet to inflate such a volume in a dramatically short amount of time is challenging for the designers. During the reaction of the chemicals for releasing nitrogen, the temperature in the air bag is raised to the extent that the driver or passenger could be burned.

To overcome the shortcomings, the present invention tends to provide an inflating device to mitigate or obviate the aforementioned problems.

SUMMARY OF THE INVENTION

The main objective of the invention is to provide an inflating device for an air bag of a vehicle and one that can reduce the amount of use of chemicals to keep the user from being burned. The inflating device has a casing, an air bag bracket, an gas generating device and a check valve. The casing has an inlet, an outlet and two sides. The air bag bracket is attached to the outlet in the casing for supporting the air bag. The gas generating device is mounted on the casing and has a tube, an air generator and a guiding plate. The tube extends into the casing and has an air channel defined in the tube and multiple vents communicating with the air channel. The gas generator is attached to one end of the tube and has a housing, a chemical holder and an igniting device. The housing is attached to the end of the tube. The chemical holder is mounted inside the housing to contain chemicals and has multiple exhausting bores communicating with the air channel in the tube. The igniting device is attached to housing and extends into the chemical holder to ignite the chemicals in the chemical holder. The guide plate is mounted inside the casing and corresponds to the vents in the tube. A gap is defined between the tube and the guide plate to define a guiding channel between the tube and the guide plate and communicating with the vents in the tube. The check valve is mounted in the casing and corresponds to and closes the inlet of the casing.

Other objects, advantages and novel features of the invention will become more apparent from the following detailed description when taken in conjunction with the accompanying drawings.

DETAILED DESCRIPTION OF PREFERRED EMBODIMENT

Figure 1:
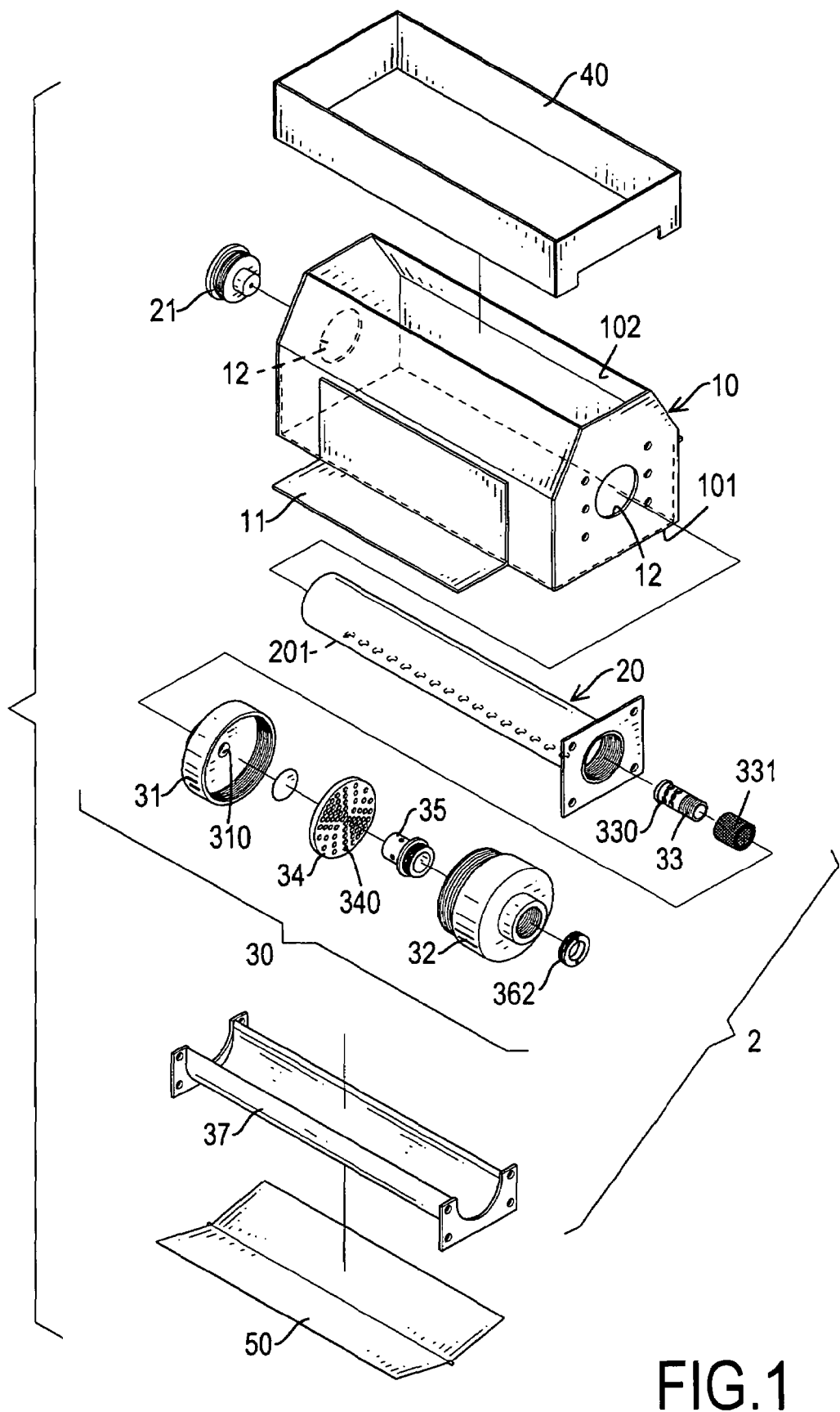
FIG. 1 is an exploded perspective view of an inflating device in accordance with the present invention.
Figure 2:
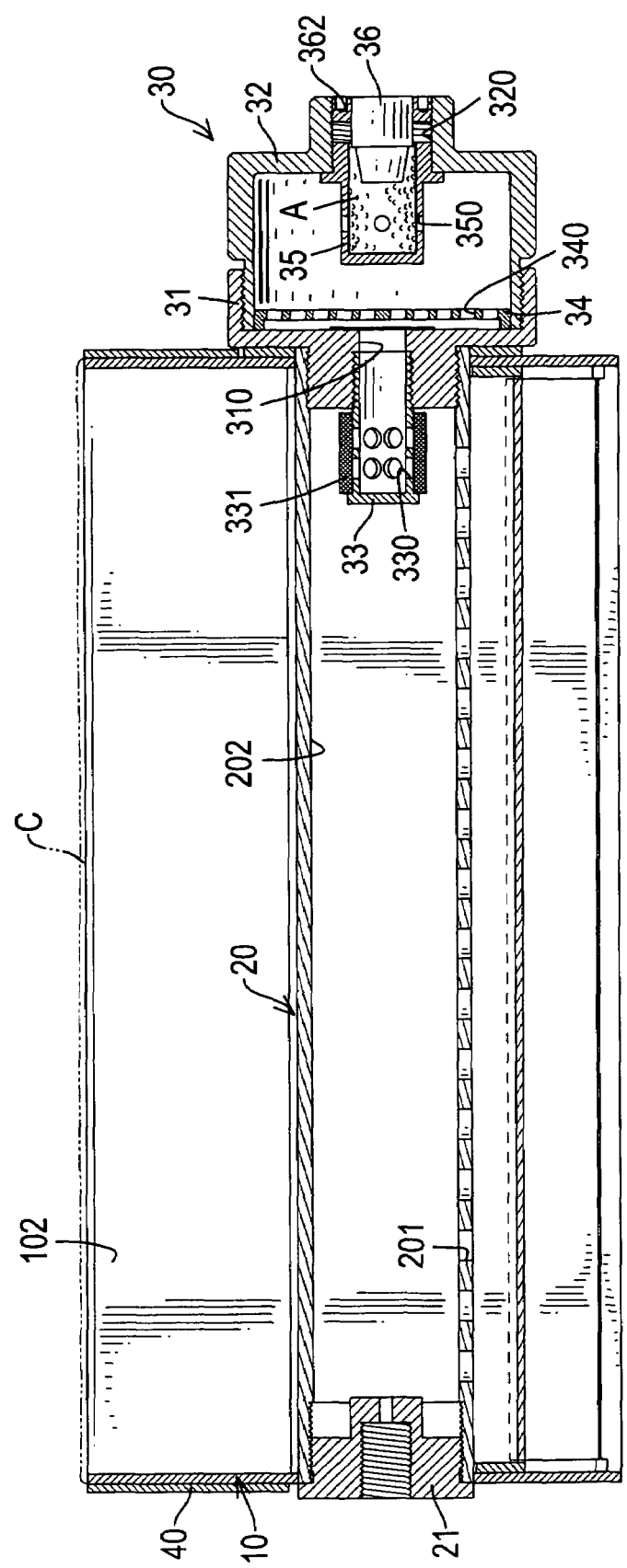
FIG. 2 is a cross sectional front view along line 2-2 in FIG. 3 of the inflating device in FIG. 1.
Figure 3:
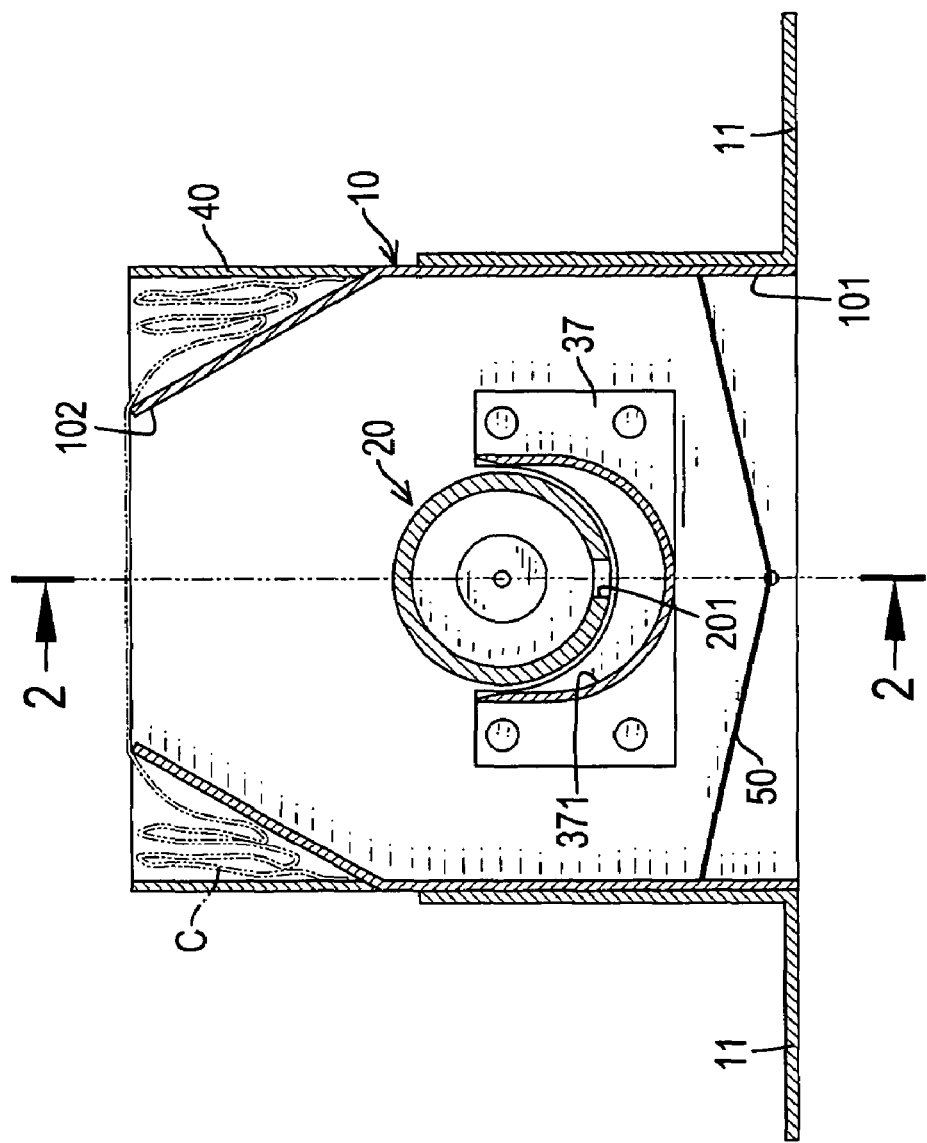
FIG. 3 is a cross sectional side plan view in FIG. 1.

With reference to FIGS. 1 to 3, an inflating device for an air bag of a vehicle in accordance with the present invention comprises a casing (10), an air bag tray (40), an gas generating device (2) and a check valve (50).

The casing (10) has an inlet (101), an outlet (102), two sides and two brackets (11). Each side has a mounting hole (12) defined through the side. The brackets (11) are L-shaped and are adapted to mount the casing (10) to the vehicle.

The air bag tray (40) is mounted on the casing (10) and corresponds to the outlet (102) to support the air bag (C).

The gas generating device (2) is mounted on the casing (10) and comprises a tube (20), an gas generator (30) and a guide plate (37). The tube (20) is mounted between the mounting holes (12) in the sides of the casing (10) and extends along an interior of the casing (10). The tube (20) has an air channel (202) defined in the tube (20) and multiple vents (201) communicating with the air channel (202). In a preferred embodiment, the vents exhausting holes (201) are defined in the tube (20) at a side opposite to the outlet (102) in the casing (10). In addition, the tube (20) has two open ends including a first open end and a second open end, and the second open end is sealed with a plug (21).

The air generator (30) is mounted on the first open end of the tube (20) and comprises a housing, a chemical holder (35), an igniting device (36), a turbulence plate (34), a filter holder (33) and a filter (331). The housing is attached to the first open end of the tube (20) and comprises a base (31) and a cover (32). The base (31) is attached to the tube (20) and has a bore (310) communicating with the air channel (202) in the tube (20). The cover (32) is detachably attached to the base (31) with threads and has a threaded mounting hole (320). The chemical holder (35) is attached to the threaded mounting hole (320) and is mounted inside the housing to contain specific chemicals (A). The chemical holder (35) has multiple exhausting bores (350) communicating with the air channel (202) in the tube (20) through the bore (310) in the base (31). The igniting device (36) is mounted in the threaded mounting hole (320) in the cover (32) with a collar (362) and extends into the chemical holder (35) to ignite the chemicals (A) in the chemical holder (35).

The turbulence plate (34) is mounted inside the housing and has multiple turbulence holes (340). The filter holder (33) is hollow, is attached to the bore (310) in the base (31) and extends into the air channel (202) in the tube (20). The filter holder (33) has multiple through holes (330) defined through the holder (33) and communicating with the air channel (202). The filter (331) is mounted around the filter holder (33) and covers the through holes (330) in the filter holder (33).

The guide plate (37) is mounted in the casing (10), is U-shaped and mounted around the tube (20) and corresponds to the vents (201) in the tube (20). With additional reference to FIGS. 3 and 4, a gap is defined between the tube (20) and the guide plate (37) to define a U-shaped guiding channel (371) between the tube (20) and the guide plate (37) and communicating with the exhausting holes (201) in the tube (20).

The check valve (50) is mounted in the casing (10) and corresponding to the inlet (101) to close the inlet (101). In a preferred embodiment, the check valve (50) comprises a V-shaped resilient sheet mounted in the casing (10). The resilient sheet has two ends attached to the sides of the casing (10) and two sides abutting with the inner surface of the casing (10).

Figure 4:
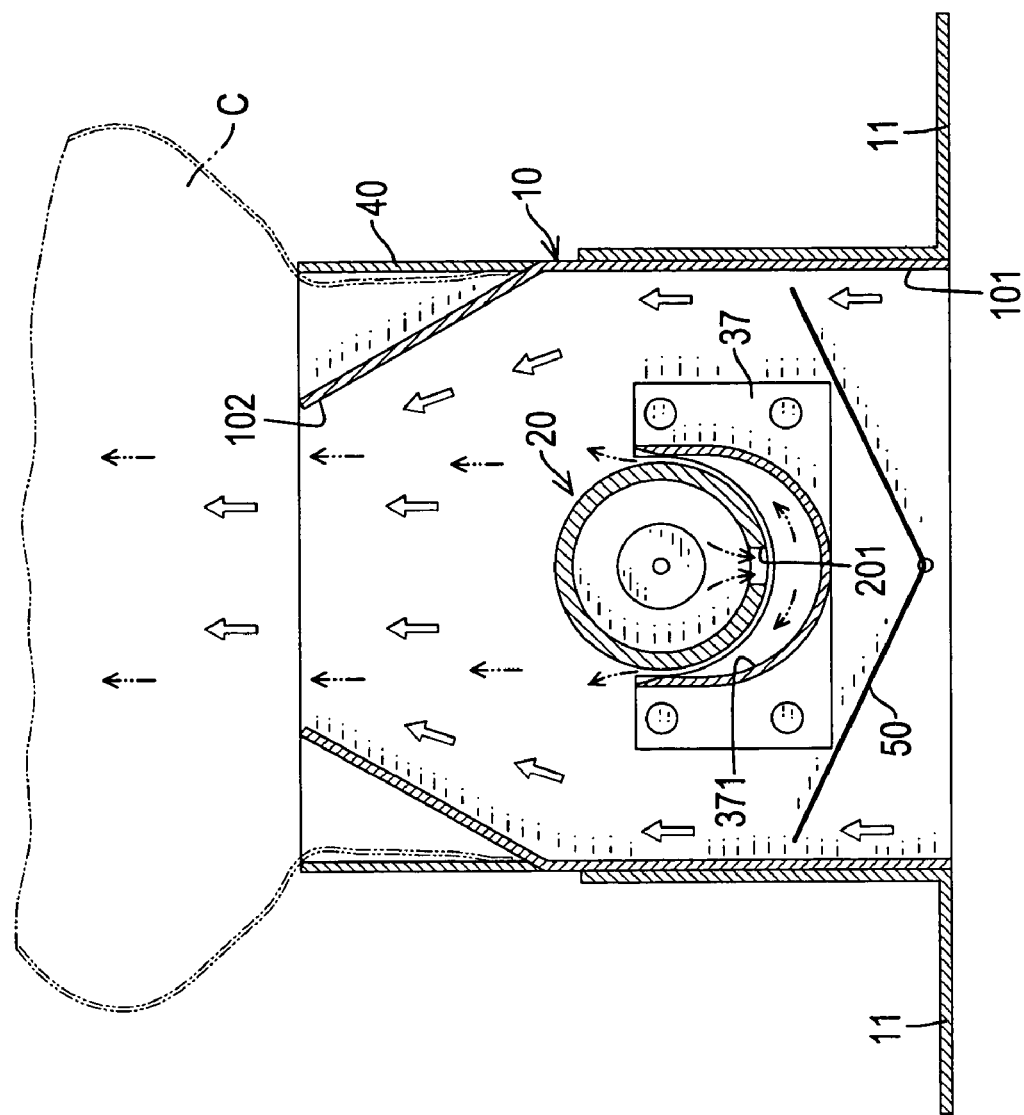
FIG. 4 is an operational side plan view in cross section of the inflating device in FIG. 1.

In operation, with reference further to FIG. 4, when the vehicle collides with another vehicle or object, the igniting device (36) is actuated to ignite the chemicals (A) in the chemical holder (35) to release nitrogen. The nitrogen will flow into and inflate air bag (C) at a high speed through the exhausting bores (350) in the chemical holder (35), the turbulence holes (340) in the turbulence plate (34), the through holes (330) in the filter holder (30), the air channel (202) and vents (201) in the tube (20), the guiding channel (371) and the outlet (102) in the casing (10). When the nitrogen flows into the air bag (C), a negative pressure will occur in the casing (10). Consequently, air outside the casing (10) will be sucked into the casing (10) through the check valve (50) and will flow into the air bag (C). Therefore, the air bag (C) is filled with about one-third nitrogen and two-thirds air. Thus, the amount of use of the chemicals (A) for releasing nitrogen is reduced relative to the prior art. In addition, because the chemical reaction for generating nitrogen is far away from the air bag (C) and the amount of the chemicals is reduced, the temperature in the air bag (C) will not rise during the inflating process so that the driver or passenger will not be burned.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An inflating device for an air bag of a vehicle comprising:
    a casing having an inlet, an outlet, two sides and an inner surface;
    an air bag tray attached to the outlet in the casing for supporting the air bag;
    an gas generating device mounted on the casing and comprising
        a tube extending into the casing and having an air channel defined in the tube and multiple vents communicating with the air channel;
        an gas generator attached to one end of the tube and comprising
            a housing attached to the end of the tube;
            a chemical holder mounted inside the housing to contain chemicals and having multiple exhausting bores communicating with the air channel in the tube; and
            an igniting device attached to housing and extending into the chemical holder to ignite the chemicals in the chemical holder; and
        a guide plate mounted inside the casing and corresponding to the vents in the tube, wherein a gap is defined between the tube and the guide plate to define a guiding channel between the tube and the guide plate and communicating with the vents in the tube; and
    a check valve mounted in the casing and corresponding and closing the inlet of the casing.

2. The inflating device as claimed in claim 1, wherein each side of the casing has a mounting hole defined through the side; and
    the tube is mounted between the mounting holes in the casing.

3. The inflating device as claimed in claim 2, wherein the casing further has two L-shaped brackets for mounting the casing to the vehicle.

4. The inflating device as claimed in claim 3, wherein the vents are defined in the tube at a side opposite to the outlet in the casing.

5. The inflating device as claimed in claim 4, wherein the tube has two open ends including a first open end and a second open end;
    the gas generator is mounted on the first open end of the tube; and
    a plug is attached to and seals the second open end of the tube.

6. The inflating device as claimed in claim 5, wherein the gas generator further has a hollow filter holder attached to the housing, extending into the air channel in the tube and having multiple through holes defined through the filter holder and communicating with the air channel; and
    a filter is mounted around the filter holder and covers the through holes in the filter holder.

7. The inflating device as claimed in claim 6, wherein the gas generator further has a turbulence plate mounted inside the housing and having multiple turbulence holes.

8. The inflating device as claimed in claim 7, wherein the housing comprises
    a base attached to the tube and having a bore communicating with the air channel in the tube; and
    a cover detachably attached to the base with threads and having a threaded mounting hole;
    the chemical holder is attached to the threaded mounting hole;
    the igniting device is mounted in the threaded mounting hole in the cover with a collar; and
    the filter holder is attached to the bore in the base.

9. The inflating device as claimed in claim 8, wherein the guide plate is U-shaped and mounted around the tube; and
    the guiding channel is U-shaped.

10. The inflating device as claimed in claim 9, wherein the check valve comprises a V-shaped resilient sheet mounted in the casing and having two ends attached to the sides of the casing and two sides abutting with the inner surface of the casing to close the inlet in the casing.

11. The inflating device as claimed in claim 1, wherein the casing further has two L-shaped brackets for mounting the casing to the vehicle.

12. The inflating device as claimed in claim 1, wherein the vents are defined in the tube at a side opposite to the outlet in the casing.

13. The inflating device as claimed in claim 1, wherein the tube has two open ends including a first open end and a second open end;
   the gas generator is mounted on the first open end of the tube; and
   a plug is attached to and seals the second open end of the tube.

14. The inflating device as claimed in claim 1, wherein
   the gas generator further has a hollow filter holder attached to the housing, extending into the air channel in the tube and having multiple through holes defined through the filter holder and communicating with the air channel; and
   a filter is mounted around the filter holder and covers the through holes in the filter holder.

15. The inflating device as claimed in claim 14, wherein the gas generator further has a turbulence plate mounted inside the housing and having multiple turbulence holes.

16. The inflating device as claimed in claim 15, wherein the housing comprises
   a base attached to the tube and having a bore communicating with the air channel in the tube; and
   a cover detachably attached to the base with threads and having a threaded mounting hole;
   the chemical holder is attached to the threaded mounting hole;
   the igniting device is mounted in the threaded mounting hole in the cover with a collar; and
   the filter holder is attached to the bore in the base.

17. The inflating device as claimed in claim 1, wherein
   the guide plate is U-shaped and mounted around the tube; and
   the guiding channel is U-shaped.

18. The inflating device as claimed in claim 1, wherein the check valve comprises a V-shaped resilient sheet mounted in the casing and having two ends attached to the sides of the casing and two sides abutting with the inner surface of the casing to close the inlet in the casing.

* * * * *